US010675670B2

(12) United States Patent
Ochiai

(10) Patent No.: US 10,675,670 B2
(45) Date of Patent: Jun. 9, 2020

(54) WASHER AND METHOD OF MANUFACTURING WASHERS

(71) Applicant: TAIHO KOGYO CO., LTD., Toyota-shi, Aichi (JP)

(72) Inventor: Hirokazu Ochiai, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 76 days.

(21) Appl. No.: 15/550,157

(22) PCT Filed: Apr. 26, 2016

(86) PCT No.: PCT/JP2016/063067
§ 371 (c)(1),
(2) Date: Aug. 10, 2017

(87) PCT Pub. No.: WO2016/208269
PCT Pub. Date: Dec. 29, 2016

(65) Prior Publication Data
US 2018/0043415 A1 Feb. 15, 2018

(30) Foreign Application Priority Data

Jun. 24, 2015 (JP) .................. 2015-126215

(51) Int. Cl.
*F16C 17/04* (2006.01)
*B21D 28/00* (2006.01)
(Continued)

(52) U.S. Cl.
CPC ............. *B21D 53/20* (2013.01); *B21D 28/06* (2013.01); *B21D 28/10* (2013.01); *F16B 43/005* (2013.01);
(Continued)

(58) Field of Classification Search
CPC ........ F16C 17/04; F16C 17/10; F16C 33/046; F16B 43/007; F16B 43/005
(Continued)

(56) References Cited

U.S. PATENT DOCUMENTS 1,492,561 A * 5/1924 Gabriel ................ F16B 43/007
301/68
3,032,184 A * 5/1962 Kuster ................... B65D 63/06
206/340
(Continued)

FOREIGN PATENT DOCUMENTS

CN 201982486 U 9/2011
DE 2433929 A1 2/1976
(Continued)

OTHER PUBLICATIONS

Extended European Search Report issued in corresponding European Patent Application No. 16814040.8-1016/3315805, dated Dec. 17, 2018 (7 pages).
(Continued)

*Primary Examiner* — Flemming Saether
(74) *Attorney, Agent, or Firm* — Buchanan Ingersoll & Rooney PC

(57) ABSTRACT

A washer that includes: an inner peripheral face formed in an arc shape; an outer peripheral face formed in an arc shape concentric with the inner peripheral face on a radially outer side of the inner peripheral face; and outer peripheral cut-out portions (such as a left outer peripheral cut-out portion and a right outer peripheral cut-out portion) formed at positions of the outer peripheral face corresponding to end portions (a first end portion and a second end portion) of the inner peripheral face to have the same shapes as outside shapes of the corresponding end portions of the inner peripheral face.

6 Claims, 12 Drawing Sheets

(51) Int. Cl.
- *B21D 53/20* (2006.01)
- *F16C 33/14* (2006.01)
- *B21D 28/10* (2006.01)
- *B21D 28/06* (2006.01)
- *F16B 43/00* (2006.01)
- *F16C 17/10* (2006.01)
- *F16C 33/04* (2006.01)

(52) U.S. Cl.
CPC .............. *F16C 17/04* (2013.01); *F16C 17/10* (2013.01); *F16C 33/046* (2013.01); *F16C 33/14* (2013.01); *F16C 2220/84* (2013.01)

(58) Field of Classification Search
USPC .......... 411/539; 206/507, 499, 338, 340, 342
See application file for complete search history.

(56) References Cited

U.S. PATENT DOCUMENTS

| | | | | |
|---|---|---|---|---|
| 3,750,239 | A * | 8/1973 | Styner | B65D 63/14 24/23 W |
| 6,488,461 | B1 * | 12/2002 | Zacharias | F16B 43/007 411/539 |
| 6,533,516 | B2 * | 3/2003 | Lemelin | B23Q 1/01 206/338 |
| 8,393,792 | B2 * | 3/2013 | Muramoto | F16C 33/046 384/429 |
| 9,677,612 | B2 * | 6/2017 | Gustafson | F16C 9/02 |
| 2006/0034556 | A1 | 2/2006 | Thompson et al. | |
| 2014/0169913 | A1 * | 6/2014 | Bochert | F16B 43/002 411/531 |

FOREIGN PATENT DOCUMENTS

| | | |
|---|---|---|
| DE | 4123231 A1 | 1/1993 |
| DE | 102006027500 A1 | 12/2007 |
| DE | 102008009856 A1 | 8/2009 |
| GB | 1358876 A | 7/1974 |
| JP | 54-098947 | 7/1979 |
| JP | 57-064423 A | 4/1982 |
| JP | H 01-104425 | 7/1989 |
| JP | 07164069 A | 6/1995 |
| JP | 2008-510107 A | 4/2008 |
| JP | 2010-023193 A | 2/2010 |
| WO | WO 2007/143987 A1 | 12/2007 |

OTHER PUBLICATIONS

Office Action (First Office Action) dated Nov. 5, 2018, by the Chinese Patent Office in corresponding Chinese Patent Application No. 201680036647.7, and an English Translation of the Office Action. (17 pages).

International Search Report (PCT/ISA/210) dated Aug. 2, 2016, by the Japanese Patent Office as the International Searching Authority for International Application No. PCT/JP2016/063067.

Written Opinion (PCT/ISA/237) dated Aug. 2, 2016, by the Japanese Patent Office as the International Searching Authority for International Application No. PCT/JP2016/063067.

Office Action (Notice of Reasons for Refusal) dated Feb. 25, 2020, by the Japanese Patent Office in corresponding Japanese Patent Application No. 2016-123079, and an English Translation of the Office Action. (19 pages).

* cited by examiner

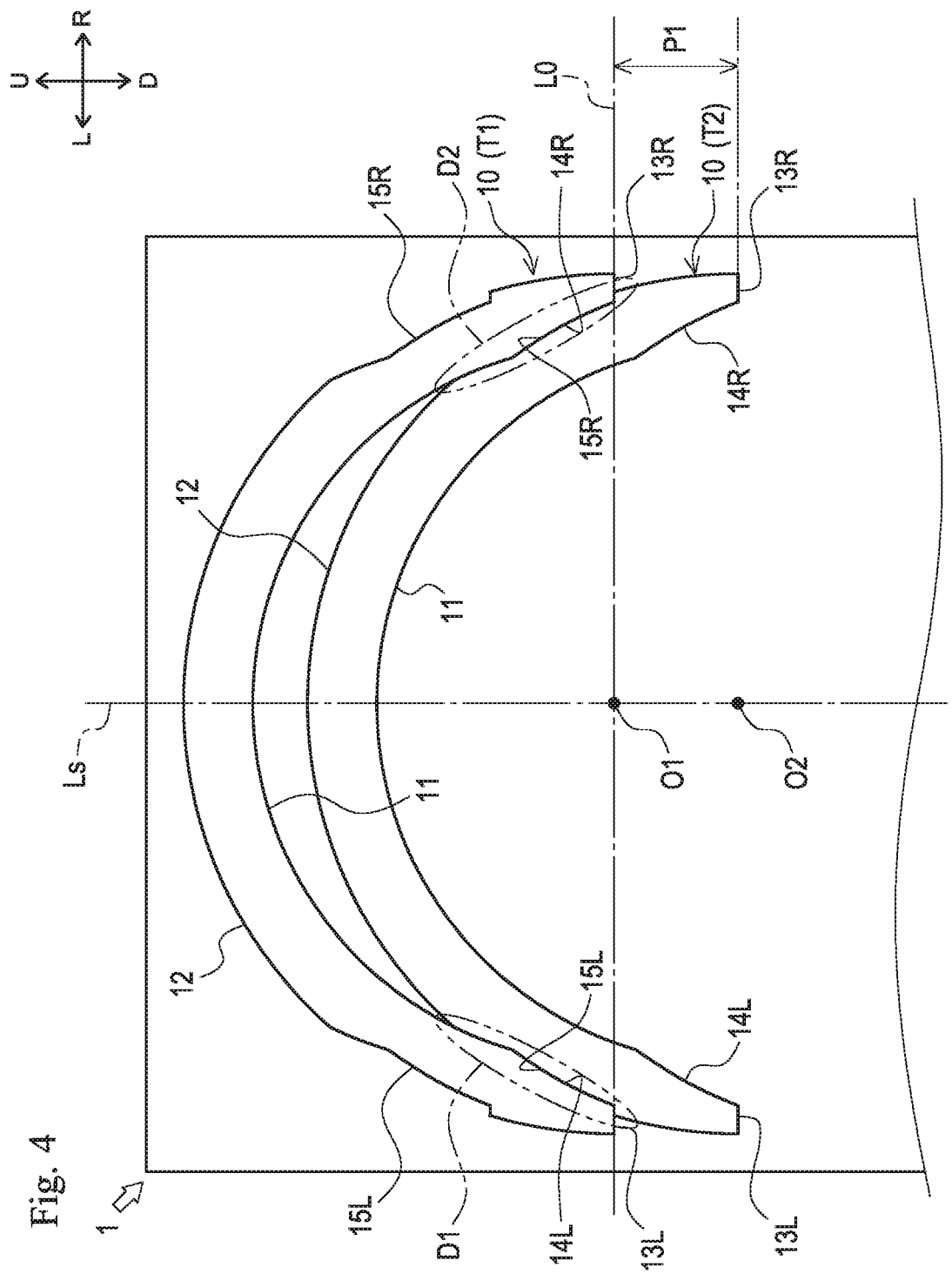

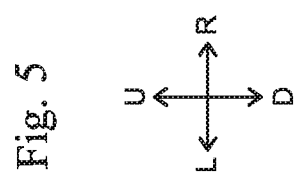
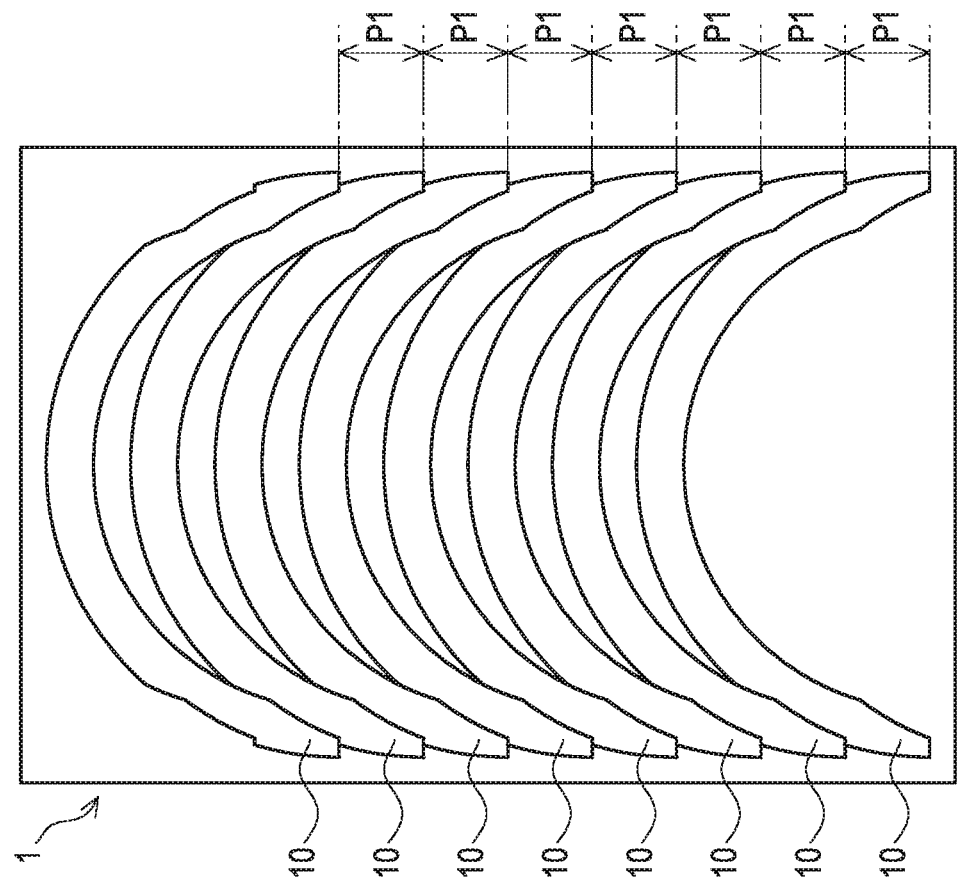

WASHER AND METHOD OF MANUFACTURING WASHERS

TECHNICAL FIELD

The present invention relates to a technique of a washer formed in an arc shape.

BACKGROUND ART

Conventionally, there has been a known technique of a washer formed in an arc shape as described in Patent Literature 1, for example.

Patent Literature 1 discloses a technique of combining two arc-shaped (semicircular) washers (washer members) and mounting the washers to a cylinder block. Such an arc-shaped washer can be manufactured by punching (stamping) a material having a panel shape by use of a predetermined die.

FIG. 12 shows a manner of manufacturing a plurality of arc-shaped washers (thrust washers 90) by punching a material 1 having a panel shape by use of a die. As shown in FIG. 12, it is possible to manufacture the plurality of thrust washers 90 by punching the material 1 several times while moving the material 1 in a constant direction with respect to the die. However, because there are clearances between the adjacent thrust washers 90 as shown in FIG. 12, the material at the portions (clearances) are wasted to result in low yields and there is room for improvement in this regard.

CITATION LIST

Patent Literature

Patent Literature 1: Japanese Patent Application Laid-open No. 2010-023193

SUMMARY OF INVENTION

Technical Problem

The present invention has been made with the above-described circumstances in view and it is an object of the invention to provide a washer and a method of manufacturing the washers with improved yields.

Solution to Problem

The problem to be solved by the invention is as described above and solutions to the problem will be described next.

A washer according to an aspect of the present invention includes: an inner peripheral face formed in an arc shape; an outer peripheral face formed in an arc shape concentric with the inner peripheral face on a radially outer side of the inner peripheral face; and an outer peripheral cut-out portion formed at a position of the outer peripheral face corresponding to an end portion of the inner peripheral face to have the same shape as an outside shape of the corresponding end portion of the inner peripheral face.

The washer according to the aspect of the invention further includes an inner peripheral cut-out portion formed at the end portion of the inner peripheral face.

In the washer according to the aspect of the invention, the inner peripheral cut-out portion is formed in an arc shape having the same radius as a radius of the arc of the outer peripheral face.

In the washer according to the aspect of the invention, the inner peripheral cut-out portion includes a first inner peripheral cut-out portion formed at one of opposite end portions of the inner peripheral face and a second inner peripheral cut-out portion formed at the other of the opposite end portions of the inner peripheral face so that the first inner peripheral cut-out portion and the second inner peripheral cut-out portion are asymmetrical in shape.

A method of manufacturing washers according to another aspect of the invention includes: a preparing step of preparing a material having a panel shape; a first punching step of punching the material to thereby obtain a first washer having a substantially arc shape; and a second punching step of punching the material to thereby obtain a second washer from a portion in contact with a portion from which the first washer is punched out.

In the method of manufacturing the washers according to the aspect of the invention, the second washer is punched out so that an outer peripheral cut-out portion formed on an outer peripheral face of the second washer is in contact with an end portion of an inner peripheral face of the first washer in the second punching step.

In the method of manufacturing the washers according to the aspect of the invention, the second washer is obtained by punching a second area partially overlapping with a first area, from which the first washer is punched out, in the second punching step.

Advantageous Effects of Invention

As effects of the present invention, the following effects are exerted.

In the washer according to the aspect of the invention, it is possible to improve yields of the washer.

In the washer according to the aspect of the invention, it is possible to effectively improve the yields of the washer having the asymmetrical shape.

In the method of manufacturing the washers according to the other aspect of the invention, it is possible to improve yields.

In the method of manufacturing the washers according to the aspect of the invention, it is possible to easily manufacture the washer.

BRIEF DESCRIPTION OF DRAWINGS

FIG. 4 is a front view showing a first area and a second area according to the first embodiment.

FIG. 5 is a schematic diagram showing a pitch of the thrust washers.

DESCRIPTION OF EMBODIMENTS

Figure 1:
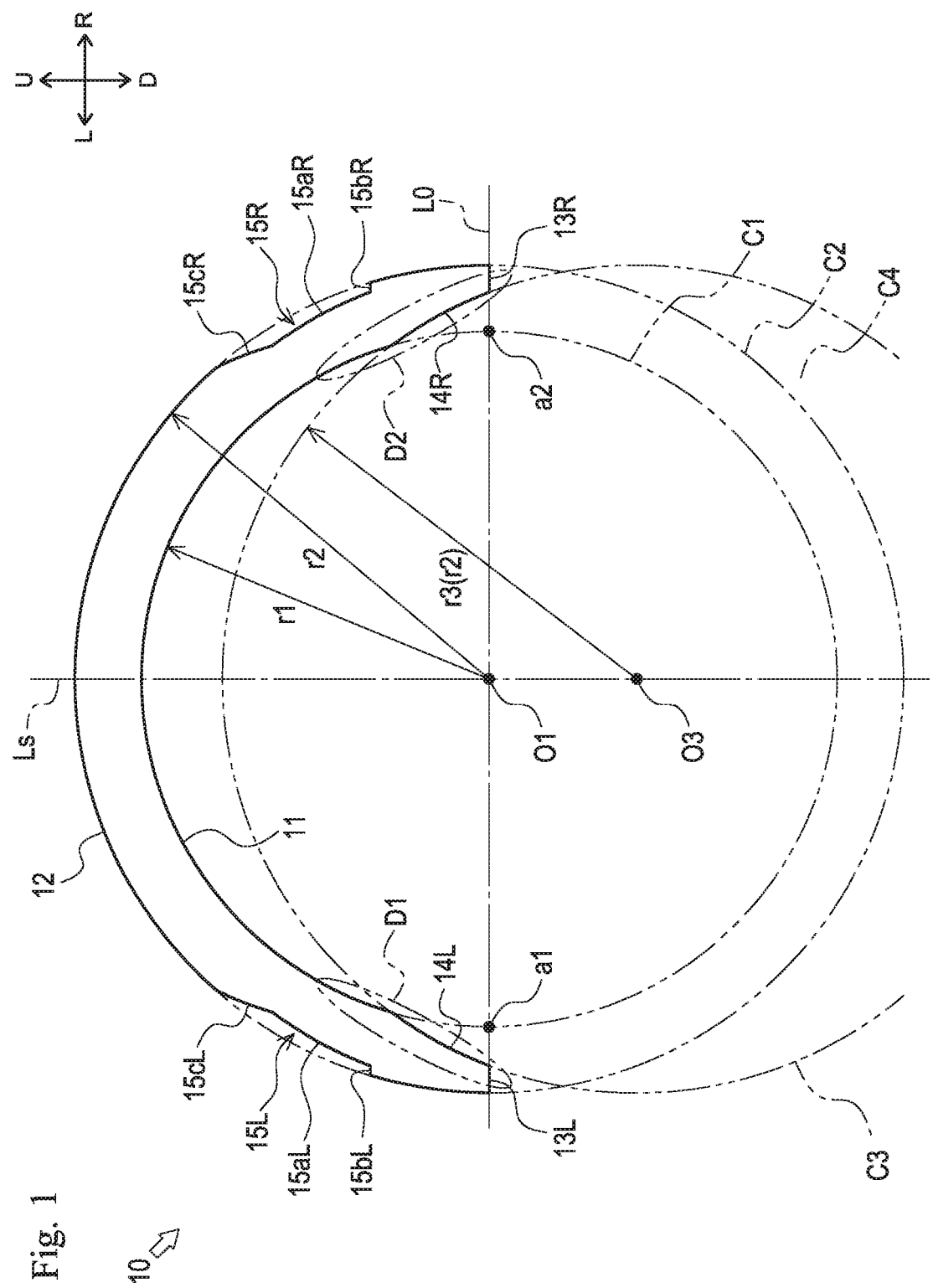
FIG. 1 is a front view showing a configuration of a thrust washer according to a first embodiment.

In the following description, directions shown by arrows U, D, L, and R in the drawings are respectively defined as upward, downward, leftward, and rightward directions. A direction perpendicular to a plane of paper of each of the drawings is defined as a front-back direction.

By using FIG. 1, a thrust washer 10 according to a first embodiment will be described below.

The thrust washer 10 is provided to a shaft member (e.g., a crankshaft of an engine) and receives a load applied to the shaft member in a thrust direction. The thrust washer 10 is formed by punching a material 1 having a panel shape described later into a substantially semicircular shape. In this way, the thrust washer 10 is formed into a panel shape having a substantially constant thickness in the front-back direction. In what follows, the shape of the thrust washer 10 in front view will be described. The thrust washer 10 mainly includes an inner peripheral face 11, an outer peripheral face 12, a left end face 13L, a right end face 13R, a left inner peripheral cut-out portion 14L, a right inner peripheral cut-out portion 14R, a left outer peripheral cut-out portion 15L, and a right outer peripheral cut-out portion 15R.

The inner peripheral face 11 is a face formed on a radially inner side of the thrust washer 10. The inner peripheral face 11 is formed along circumference C1 of an arc centered at a predetermined point (arc center O1) and having radius r1. The inner peripheral face 11 is formed into an arc shape (substantially semicircular shape) extending above arc center O1 from a left side to a right side.

The outer peripheral face 12 is a face formed on a radially outer side of the thrust washer 10. The outer peripheral face 12 is formed along circumference C2 of an arc centered at arc center O1 and having radius r2. The outer peripheral face 12 is formed into an arc shape (substantially semicircular shape) extending above arc center O1 from the left side to the right side. Radius r2 is set to be longer than radius r1. In this manner, the outer peripheral face 12 is formed in the arc shape concentric with the inner peripheral face 11.

The left end face 13L is a face connecting a left end portion of the inner peripheral face 11 and a left end portion of the outer peripheral face 12. The left end face 13L is formed on a straight line (first imaginary straight line L0) extending in a left-right direction through arc center O1. One end portion (inner peripheral end portion) of the left end face 13L is connected to the left end portion of the inner peripheral face 11 through the left inner peripheral cut-out portion 14L (described later). The other end portion (outer peripheral end portion) of the left end face 13L is connected to the left end portion of the outer peripheral face 12.

The right end face 13R is a face connecting a right end portion of the inner peripheral face 11 and a right end portion of the outer peripheral face 12. The right end face 13R is formed so that the left end face 13L and the right end face 13R are symmetrical with respect to a straight line (symmetry axis Ls) extending in a vertical direction through arc center O1 (perpendicular to first imaginary straight line L0). In other words, the right end face 13R is formed on first imaginary straight line L0.

By forming the left end face 13L and the right end face 13R on first imaginary straight line L0 passing through arc center O1 (i.e., diameters of circumferences C1 and C2) in this manner, the thrust washer 10 is formed in the semicircular shape (an arc shape having a central angle of 180°).

The left inner peripheral cut-out portion 14L is a face formed by cutting out an inner peripheral side of a left end portion of the thrust washer 10 (the left end portion of the inner peripheral face 11). The left inner peripheral cut-out portion 14L is formed in a shape of a curved line extending from the left end face 13L toward an upper right side. To put it more concretely, the left inner peripheral cut-out portion 14L is formed along circumference C3 of an arc centered at arc center O3 set on symmetry axis Ls and below arc center O1 and having radius r3. Here, radius r3 of circumference C3 is set to be equal to radius r2 of circumference C2. In this way, the left inner peripheral cut-out portion 14L is formed to extend from the inner peripheral face 11 to the left end face 13L. In this manner, the left inner peripheral cut-out portion 14L is formed by cutting out a portion of the thrust washer 10, formed in the semicircular shape, including point of intersection a1 of a left end portion of circumference C1 and first imaginary straight line L0.

The right inner peripheral cut-out portion 14R is a face formed by cutting out an inner peripheral side of a right end portion of the thrust washer 10 (the right end portion of the inner peripheral face 11). The right inner peripheral cut-out portion 14R is formed in a shape of a curved line extending from the right end face 13R toward an upper left side. To put it more concretely, the right inner peripheral cut-out portion 14R is formed along circumference C3. In this way, the right inner peripheral cut-out portion 14R is formed so that the left inner peripheral cut-out portion 14L and the right inner peripheral cut-out portion 14R are symmetrical with respect to symmetry axis Ls. In other words, the right inner peripheral cut-out portion 14R is formed by cutting out a portion of the thrust washer 10, formed in the semicircular shape, including point of intersection a2 of a right end portion of circumference C1 and first imaginary straight line L0.

The left outer peripheral cut-out portion 15L is a face formed by cutting out a portion (close to the left end portion) of the outer peripheral face 12. The left outer peripheral cut-out portion 15L is formed at a position corresponding to the left inner peripheral cut-out portion 14L, i.e., the position above the left inner peripheral cut-out portion 14L. The left outer peripheral cut-out portion 15L mainly includes a left arc-shaped face 15aL, a left first side face 15bL, and a left second side face 15cL.

The left arc-shaped face 15aL is a face forming a bottom portion of the left outer peripheral cut-out portion 15L. The left arc-shaped face 15aL is formed in a shape of a curved line extending from a lower left side toward an upper right side.

The left first side face 15bL is a face forming one end portion (left end portion) of the left outer peripheral cut-out portion 15L. The left first side face 15bL is formed in a shape of a straight line extending from a left end portion of the left arc-shaped face 15aL toward a left side.

The left second side face 15cL is a face forming the other end portion (right end portion) of the left outer peripheral cut-out portion 15L. The left second side face 15cL is formed in a shape of a curved line extending from a right end portion of the left arc-shaped face 15aL toward an upper right side.

Here, the left outer peripheral cut-out portion 15L is formed in the same shape as an outside shape of a portion close to the left end portion of the inner peripheral face 11

(a first end portion D1 in FIG. 1). To put it concretely, the left arc-shaped face 15aL is formed in the same shape as the left inner peripheral cut-out portion 14L. The left first side face 15bL is formed in the same shape as the left end face 13L (more specifically, a portion close to a right end portion of the left end face 13L). The left second side face 15cL is formed in the same shape as the inner peripheral face 11 (more specifically, a portion close to the left end portion of the inner peripheral face 11).

The right outer peripheral cut-out portion 15R is formed by cutting out a portion (close to the right end portion) of the outer peripheral face 12. The right outer peripheral cut-out portion 15R is formed at a position corresponding to the right inner peripheral cut-out portion 14R, i.e., the position above the right inner peripheral cut-out portion 14R. The right outer peripheral cut-out portion 15R is formed so that the left outer peripheral cut-out portion 15L and the right outer peripheral cut-out portion 15R are symmetrical with respect to the symmetry axis Ls. To put it concretely, the right outer peripheral cut-out portion 15R mainly includes a right arc-shaped face 15aR, a right first side face 15bR, and a right second side face 15cR.

The right arc-shaped face 15aR is a face forming a bottom portion of the right outer peripheral cut-out portion 15R. The right arc-shaped face 15aR is formed in a shape of a curved line extending from a lower right side toward an upper left side.

The right first side face 15bR is a face forming one end portion (right end portion) of the right outer peripheral cut-out portion 15R. The right first side face 15bR is formed in a shape of a straight line extending from a right end portion of the right arc-shaped face 15aR toward a right side.

The right second side face 15cR is a face forming the other end portion (left end portion) of the right outer peripheral cut-out portion 15R. The right second side face 15cR is formed in a shape of a curved line extending from a left end portion of the right arc-shaped face 15aR toward an upper left side.

Here, the right outer peripheral cut-out portion 15R is formed in the same shape as an outside shape of a portion close to the right end portion of the inner peripheral face 11 (a second end portion D2 in FIG. 1). To put it concretely, the right arc-shaped face 15aR is formed in the same shape as the right inner peripheral cut-out portion 14R. The right first side face 15bR is formed in the same shape as the right end face 13R (more specifically, a portion close to a left end portion of the right end face 13R). The right second side face 15cR is formed in the same shape as the inner peripheral face 11 (more specifically, a portion close to the right end portion of the inner peripheral face 11).

Moreover, a relative positional relationship between the left outer peripheral cut-out portion 15L and the right outer peripheral cut-out portion 15R is the same as a relative positional relationship between the first end portion D1 and the second end portion D2.

In this manner, the thrust washer 10 is formed in the shape obtained by cutting out proper portions from the inner peripheral face and the outer peripheral face of the material having the substantially semicircular panel shape. The two thrust washers 10 are combined and disposed in an annular shape and mounted to proper positions (e.g., a housing for supporting a shaft member).

By using FIGS. 2 to 5, the method of manufacturing the thrust washers 10 formed as described above will be described below.

Figure 2:
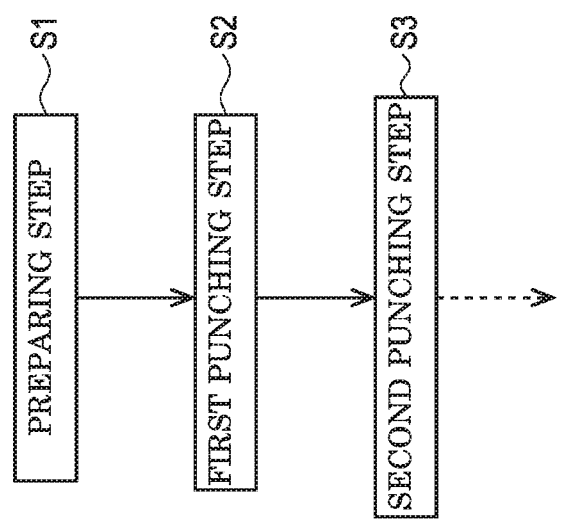
FIG. 2 is a chart showing a method of manufacturing the thrust washers.

As shown in FIG. 2, the method of manufacturing the thrust washers 10 mainly includes a preparing step S1, a first punching step S2, and a second punching step S3.

Figure 3B:
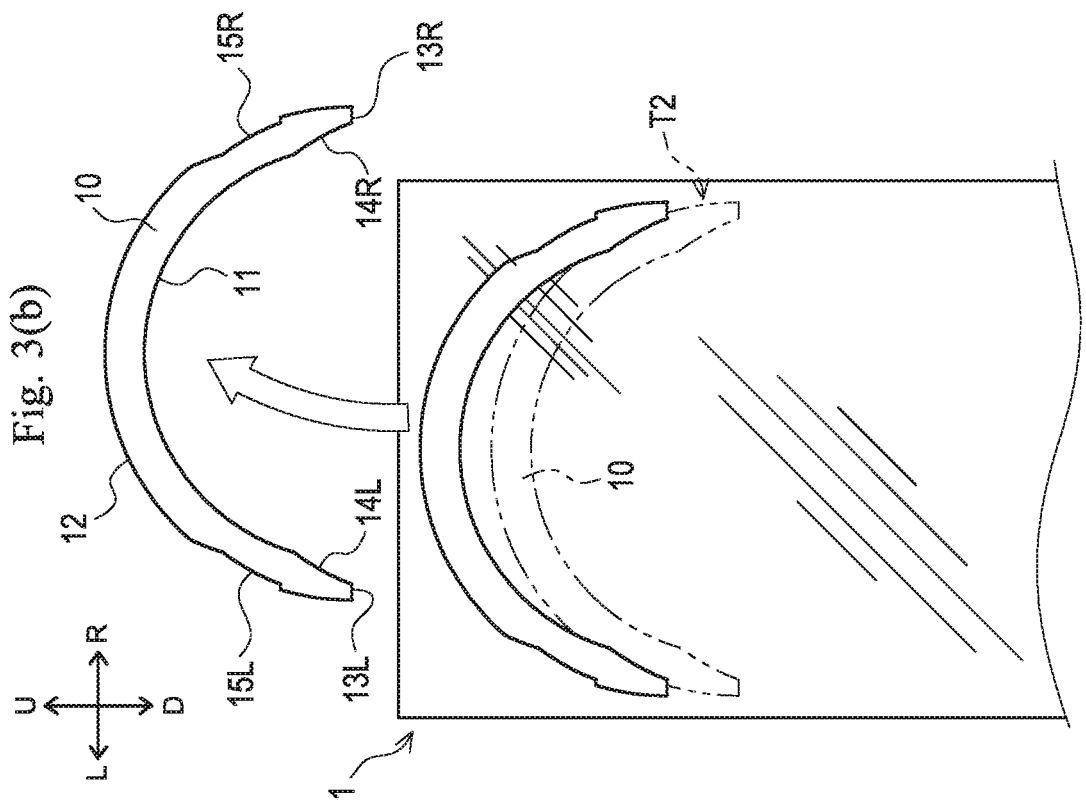
FIG. 3(b) is a front view showing a manner in which the thrust washer is punched out in a first punching step.
Figure 3A:
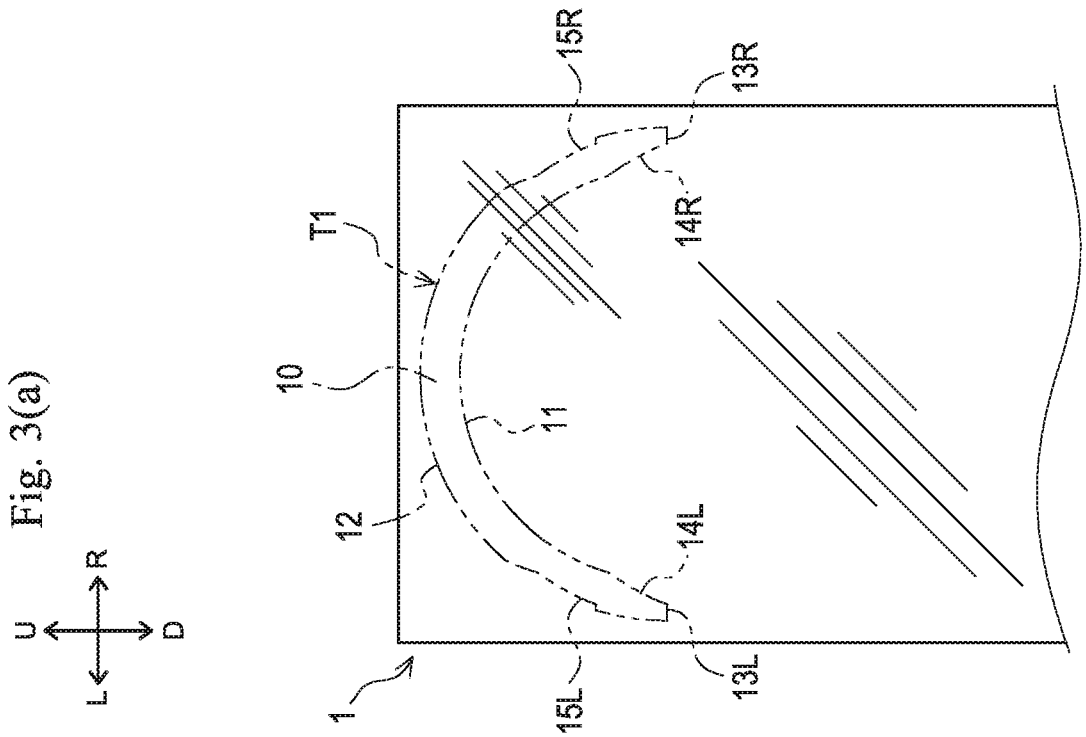
FIG. 3(a) is a front view showing a material prepared in a preparing step.

The preparing step S1 is a step of preparing a material 1. As shown in FIG. 3(a), the material 1 is a rectangular panel-shaped member. The material 1 is formed by a proper material (e.g., a steel sheet made of a single kind of material and bimetal made of a plurality of kinds of materials). The material 1 is disposed with its longitudinal direction in the vertical direction.

After the preparing step S1, the first punching step S2 is carried out.

The first punching step S2 is a step of punching out the thrust washer 10 from the material 1 prepared in the preparing step S1. In the first punching step S2, a first area T1 (see FIG. 3(a)) corresponding to the shape of the thrust washer 10 is punched out from the material 1 by using a predetermined die formed in the shape of the thrust washer 10. In this way, it is possible to obtain the thrust washer 10 from the material 1 (see FIG. 3(b)). At this time, the first area T1 is set so that the symmetry axis Ls of the thrust washer 10 of the first area T1 extends along the longitudinal direction (vertical direction) of the material 1 (see FIG. 4).

After the first punching step S2, the second punching step S3 is carried out.

The second punching step S3 is a step of further punching a thrust washer 10 having the same shape out from the material 1 from which the thrust washer 10 has been punched out in the first punching step S2. In the second punching step S3, a second area T2 (see FIG. 3(b)) corresponding to the shape of the thrust washer 10 is punched out from the material 1 by using the same die used in the first punching step S2.

Here, by using FIG. 4, a positional relationship between the first area T1 and the second area T2 will be described. As shown in FIG. 4, the second area T2 is set at a position displaced in a predetermined direction from the first area T1. To put it concretely, the second area T2 is set at the position displaced from the first area T1 by a predetermined pitch P1 in a downward direction (direction in which the left end face 13L and the right end face 13R face) along the symmetry axis Ls of the thrust washer 10 of the first area T1. The pitch P1 is set to such a value that the first area T1 and the second area T2 are in contact with each other. To put it concretely, the pitch P1 is set so that the left outer peripheral cut-out portion 15L and the right outer peripheral cut-out portion 15R of the thrust washer 10 in the second area T2 are in contact with the first end portion D1 and the second end portion D2 of the thrust washer 10 in the first area T1. Arc center O1 (shown as arc center O2 for convenience in FIG. 4) of an inner peripheral face 11 or the like of the second area T2 set in this manner is positioned on the symmetry axis Ls of the thrust washer 10 in the first area T1.

By setting the second area T2 in this manner, it is possible to set a small pitch P1 while avoiding overlap (interference) between the thrust washer 10 in the first area T1 and the thrust washer 10 in the second area T2. By setting the small pitch P1, it is possible to reduce a clearance between the first area T1 and the second area T2 to increase the number of thrust washers 10 which can be obtained from the material 1 to thereby improve yields. As a result, it is possible to achieve increase in productivity and reduction in cost.

After the second punching step S3, a step (not shown) of further punching out a thrust washer 10 from the material 1 similarly to the second punching step S3 is repeated arbitrary times. In this way, it is possible to obtain a plurality of thrust washers 10 from the material 1 (see FIG. 5).

As described above, the thrust washer 10 according to the first embodiment includes: the inner peripheral face 11 formed in the arc shape; the outer peripheral face 12 formed in the arc shape concentric with the inner peripheral face 11 on the radially outer side of the inner peripheral face 11; and the outer peripheral cut-out portions (the left outer peripheral cut-out portion 15L and the right outer peripheral cut-out portion 15R) formed at positions of the outer peripheral face 12 corresponding to the end portions (the first end portion D1 and the second end portion D2) of the inner peripheral face 11 to have the same shapes as the outside shapes of the corresponding end portions of the inner peripheral face 11.

With this configuration, it is possible to improve the yields. In other words, by setting the positions of the thrust washers 10 so that the end portions of the inner peripheral face 11 of one of two adjacent thrust washers 10 and the outer peripheral cut-out portions of the other are in contact with each other when the thrust washers 10 are punched out from the material 1, it is possible to set the small pitch between the thrust washers 10.

The thrust washer 10 further includes the inner peripheral cut-out portions (the left inner peripheral cut-out portion 14L and the right inner peripheral cut-out portion 14R) formed at the end portions of the inner peripheral face 11.

With this configuration, it is possible to effectively improve the yields. In other words, it is possible to set the smaller pitch between two adjacent thrust washers 10. Moreover, it is possible to reduce depths of the outer peripheral cut-out portions corresponding to the inner peripheral cut-out portions (depths of the cut-out portions from the outer peripheral face 12) to thereby prevent reduction in strength.

Each of the inner peripheral cut-out portions is formed in the arc shape having the same radius r2 as the arc radius of the outer peripheral face 12.

With this configuration, it is possible to effectively improve the yields. In other words, it is possible to set the smaller pitch between two adjacent thrust washers 10. Moreover, by forming the outer peripheral cut-out portions corresponding to the inner peripheral cut-out portions in the same arc shapes as the outer peripheral face 12, it is possible to prevent reduction in strength.

The method of manufacturing the thrust washers 10 according to the first embodiment includes: the preparing step S1 of preparing the material 1 having a panel shape; the first punching step S2 of punching the material 1 to thereby obtain the substantially arc-shaped first thrust washer 10; and the second punching step S3 of punching the material 1 to thereby obtain the second thrust washer 10 from the portion adjacent to the portion from which the first thrust washer 10 is punched out.

With this configuration, it is possible to improve the yields. In other words, it is possible to set the small pitch between the two thrust washers by obtaining the second thrust washer 10 from the portion adjacent to the first thrust washer 10.

In the method of manufacturing the thrust washers 10 according to the first embodiment, the second thrust washer 10 is punched out so that the outer peripheral cut-out portions formed on the outer peripheral face of the second thrust washer 10 are in contact with the end portions of the inner peripheral face 11 of the first thrust washer 10 in the second punching step S3.

With this configuration, it is possible to effectively improve the yields. In other words, it is possible to set the smaller pitch between the first thrust washer 10 and the second thrust washer 10 by forming the outer peripheral cut-out portions on the second thrust washer 10.

Figure 6:
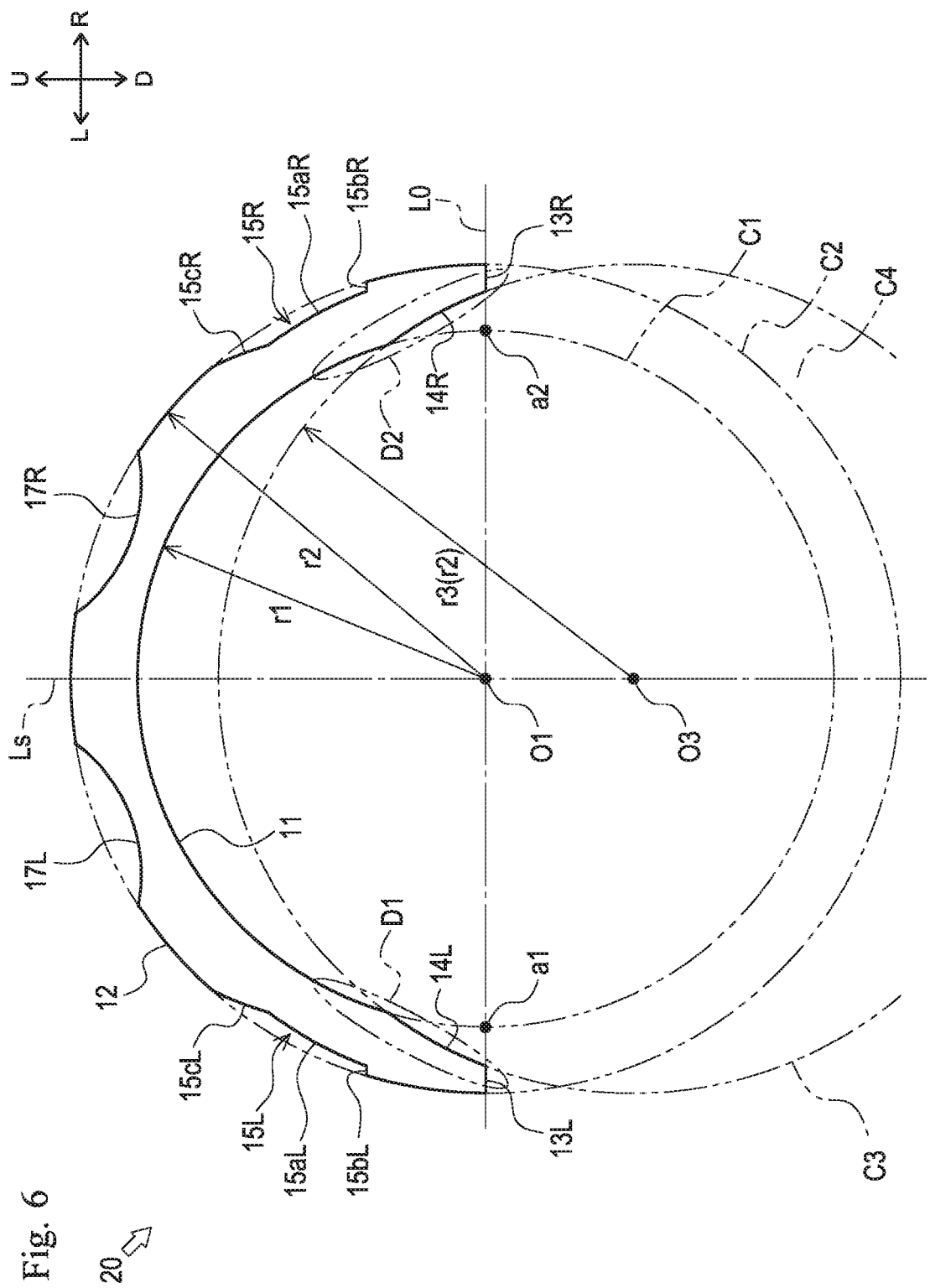
FIG. 6 is a front view showing a configuration of a thrust washer according to a second embodiment.

A thrust washer 20 according to a second embodiment will be described below by using FIG. 6.

The thrust washer 20 is different from the thrust washer 10 according to the first embodiment mainly in that the thrust washer 20 further includes a left additional cut-out portion 17L and a right additional cut-out portion 17R. Other configurations similar to those of the thrust washer 10 according to the first embodiment will be denoted by the same reference signs and description of the configurations will be omitted properly.

The left additional cut-out portion 17L is a face formed by cutting out a portion (slightly displaced leftward from a central portion in a left-right direction) of an outer peripheral face 12. The left additional cut-out portion 17L is formed at a position separated by a predetermined distance in a rightward direction from a left outer peripheral cut-out portion 15L. The left additional cut-out portion 17L is formed in an arc shape recessed toward arc center O1.

The right additional cut-out portion 17R is a face formed by cutting out a portion (slightly displaced rightward from the central portion in the left-right direction) of the outer peripheral face 12. The right additional cut-out portion 17R is formed so that the left additional cut-out portion 17L and the right additional cut-out portion 17R are symmetrical with respect to symmetry axis Ls.

In this manner, the plurality of cut-out portions (the left outer peripheral cut-out portion 15L, the left additional cut-out portion 17L, the right additional cut-out portion 17R, and a right outer peripheral cut-out portion 15R) are formed on the outer peripheral face 12 of the thrust washer 20. The plurality of cut-out portions are disposed at substantially equal intervals on the outer peripheral face 12. By forming the left additional cut-out portion 17L and the right additional cut-out portion 17R on the thrust washer 20 in this manner, it is possible to reduce the thrust washer 20 in weight.

Figure 7:
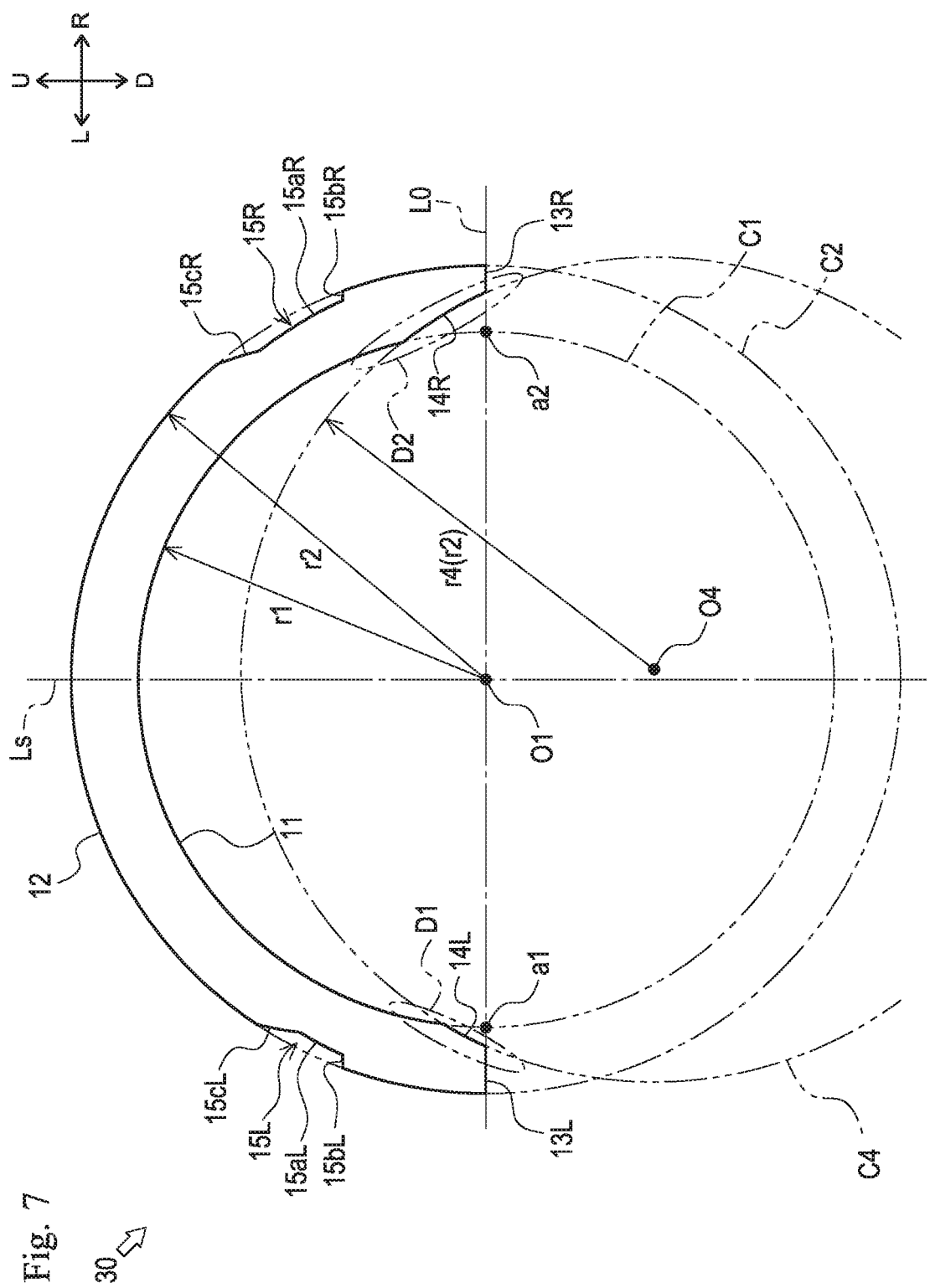
FIG. 7 is a front view showing a configuration of a thrust washer according to a third embodiment.

A thrust washer 30 according to a third embodiment will be described below by using FIG. 7.

The thrust washer 30 is different from the thrust washer 10 according to the first embodiment mainly in shapes of a left inner peripheral cut-out portion 14L, a right inner peripheral cut-out portion 14R, a left outer peripheral cut-out portion 15L, and a right outer peripheral cut-out portion 15R. Other configurations similar to those of the thrust washer 10 according to the first embodiment will be denoted by the same reference signs and description of the configurations will be omitted properly.

The left inner peripheral cut-out portion 14L is formed in a curved shape extending from a left end face 13L to an upper right side. To put it more concretely, the left inner peripheral cut-out portion 14L is formed along circumference C4 of an arc centered at arc center O4 set below arc center O1 and slightly to the right of symmetry axis Ls and having radius r4. Here, radius r4 of circumference C4 is set to be equal to radius r2 of circumference C2.

The right inner peripheral cut-out portion 14R is formed in a curved shape extending from a right end face 13R to an upper left side. To put it more concretely, the right inner peripheral cut-out portion 14R is formed along circumference C4. Because arc center O4 of circumference C4 is positioned to the right of symmetry axis Ls, the right inner peripheral cut-out portion 14R is formed to be larger than the left inner peripheral cut-out portion 14L (to be larger in vertical dimension and left-right dimension). In other words, the right inner peripheral cut-out portion 14R is formed so that the left inner peripheral cut-out portion 14L and the right inner peripheral cut-out portion 14R are asymmetrical.

The left outer peripheral cut-out portion 15L is formed at a position corresponding to the left inner peripheral cut-out portion 14L, i.e., the position above the left inner peripheral cut-out portion 14L. The left outer peripheral cut-out portion 15L is formed in the same shape as an outside shape of a portion close to a left end portion of the inner peripheral face 11 (a first end portion D1 in FIG. 7).

The right outer peripheral cut-out portion 15R is formed at a position corresponding to the right inner peripheral cut-out portion 14R, i.e., the position above the right inner peripheral cut-out portion 14R. The right outer peripheral cut-out portion 15R is formed in the same shape as an outside shape of a portion close to a right end portion of the inner peripheral face 11 (a second end portion D2 in FIG. 7). In other words, the right outer peripheral cut-out portion 15R is formed so that the left outer peripheral cut-out portion 15L and the right outer peripheral cut-out portion 15R are asymmetrical.

Corresponding to the left inner peripheral cut-out portion 14L (the first end portion D1) which is formed to be relatively small in this manner, the left outer peripheral cut-out portion 15L is also formed to be relatively small. On the other hand, corresponding to the right inner peripheral cut-out portion 14R (the second end portion D2) which is formed to be relatively large, the right outer peripheral cut-out portion 15R is also formed to be relatively large. In this manner, the thrust washer 30 can be formed in a bilaterally asymmetrical shape according to a purpose of use, a shape of a place where the thrust washer 30 is to be disposed, and the like.

By using FIG. 8, a method of manufacturing the thrust washers 30 formed as described above will be described below.

The method of manufacturing the thrust washers 30 is different from the method of manufacturing the thrust washers 10 according to the first embodiment mainly in ways of setting positions of a first area T1 in which a material 1 is punched in a first punching step S2 and a second area T2 in which the material 1 is punched in a second punching step S3. The positions of the first area T1 and the second area T2 will be described below.

The first area T1 is set so that a symmetry axis Ls of the thrust washer 30 in the first area T1 inclines at angle x in a rightward direction with respect to a longitudinal direction (vertical direction) of the material 1. In this way, the thrust washer 30 in the first area T1 is in a posture inclining rightward.

The second area T2 is set at a position displaced downward by a predetermined pitch P2 in the longitudinal direction (vertical direction) of the material 1 from the first area T1. In this way, a symmetry axis Ls of the thrust washer 30 in the second area T2 also inclines at angle x in the rightward direction with respect to the longitudinal direction of the material 1. The pitch P2 is set to such a value that the first area T1 and the second area T2 are in contact with each other. To put it concretely, the pitch P2 is set so that the left outer peripheral cut-out portion 15L and the right outer peripheral cut-out portion 15R of the thrust washer 30 in the second area T2 are in contact with the first end portion D1 and the second end portion D2 of the thrust washer 30 in the first area T1. Arc center O1 (shown as arc center O5 for convenience in FIG. 10) of an inner peripheral face 11 or the like of the second area T2 set in this manner is positioned directly below arc center O1 of the thrust washer 30 in the first area T1.

To manufacture the thrust washer 30 formed bilaterally asymmetrically in this manner, the thrust washers 30 are similarly disposed so that the left outer peripheral cut-out portion 15L and the right outer peripheral cut-out portion 15R of the thrust washer 30 in the second area T2 are in contact with the first end portion D1 and the second end portion D2 of the thrust washer 30 in the first area T1. In this way, it is possible to set the small pitch P2.

At this time, by properly inclining the thrust washers 30 in the first area T1 and the second area T2 (inclining at angle x in the rightward direction in the present embodiment), the arc centers (arc center O1 and arc center O5) of the respective thrust washers 30 are arranged along the longitudinal direction (vertical direction) of the material 1. In this way, even if the thrust washers 30 are bilaterally asymmetrical, the plurality of thrust washers 30 can be manufactured at the small pitch P2 by properly punching the material 1 while moving the material 1 along the longitudinal direction similarly to the bilaterally symmetrical thrust washer 10 and the like.

Figure 8:
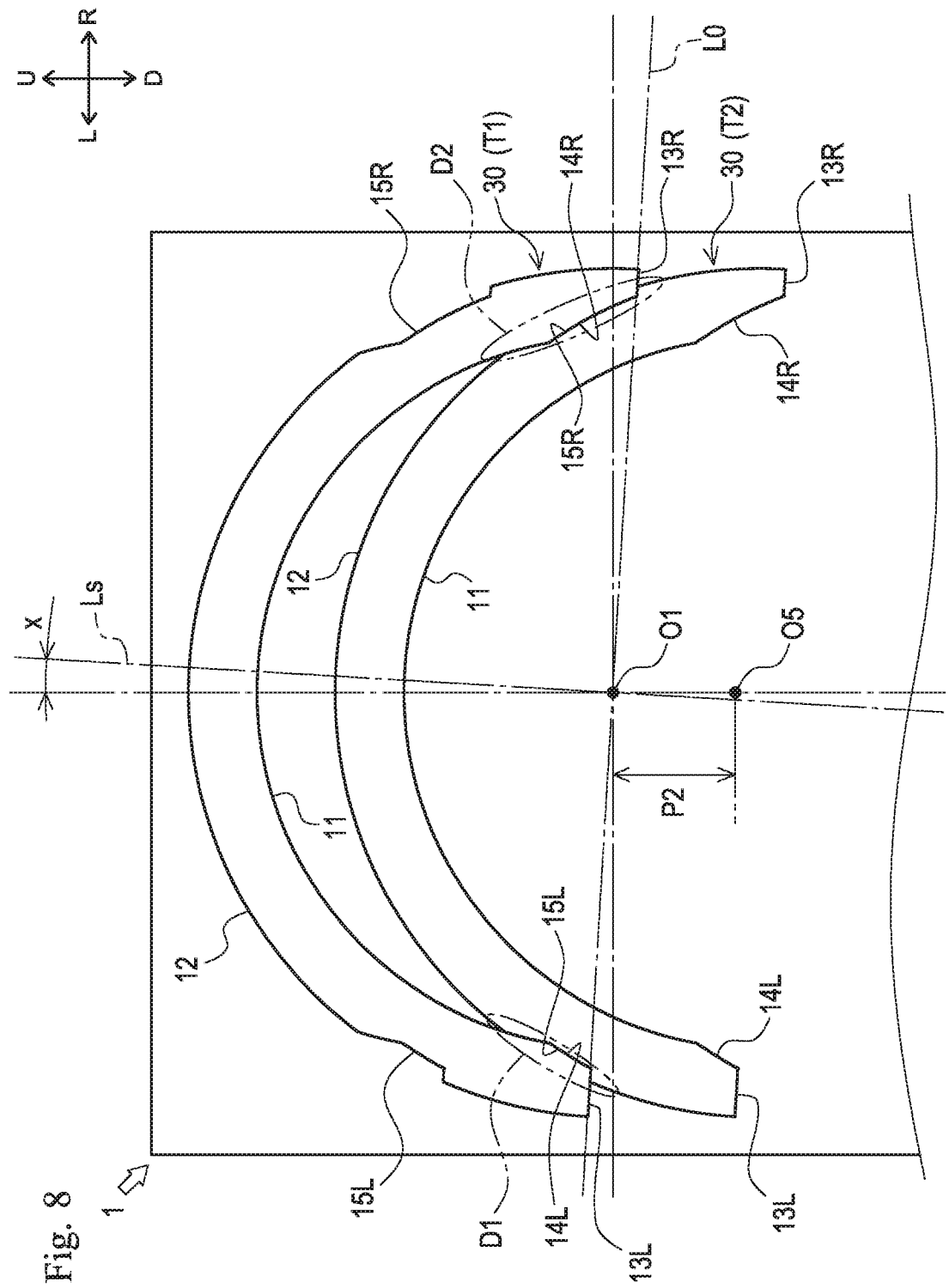
FIG. 8 is a front view showing a first area and a second area according to the third embodiment.

Although the symmetry axis Ls of the thrust washers 30 in the first area T1 and the second area T2 inclines rightward with respect to the longitudinal direction of the material 1 in the example shown in FIG. 8, the invention is not limited hereto. The symmetry axis Ls may incline leftward.

As described above, the inner peripheral cut-out portion of the thrust washer 30 according to the third embodiment includes the left inner peripheral cut-out portion 14L (a first inner peripheral cut-out portion) formed at one of opposite end portions of the inner peripheral face 11 and the right inner peripheral cut-out portion 14R (a second inner peripheral cut-out portion) formed at the other of the opposite end portions of the inner peripheral face 11 so that the left inner peripheral cut-out portion 14L and the right inner peripheral cut-out portion 14R are asymmetrical.

With this configuration, it is possible to improve yields of the thrust washers 30 having the asymmetrical shapes.

By using FIGS. 9 to 11, a method of manufacturing thrust washers 40 according to a fourth embodiment will be described below.

The method of manufacturing the thrust washers 40 according to the fourth embodiment is different from the method of manufacturing the thrust washers 30 according to the third embodiment mainly in shapes of areas (a first area T1, a second area T2) in which a material 1 is punched. A specific description will be given below.

Figure 9:
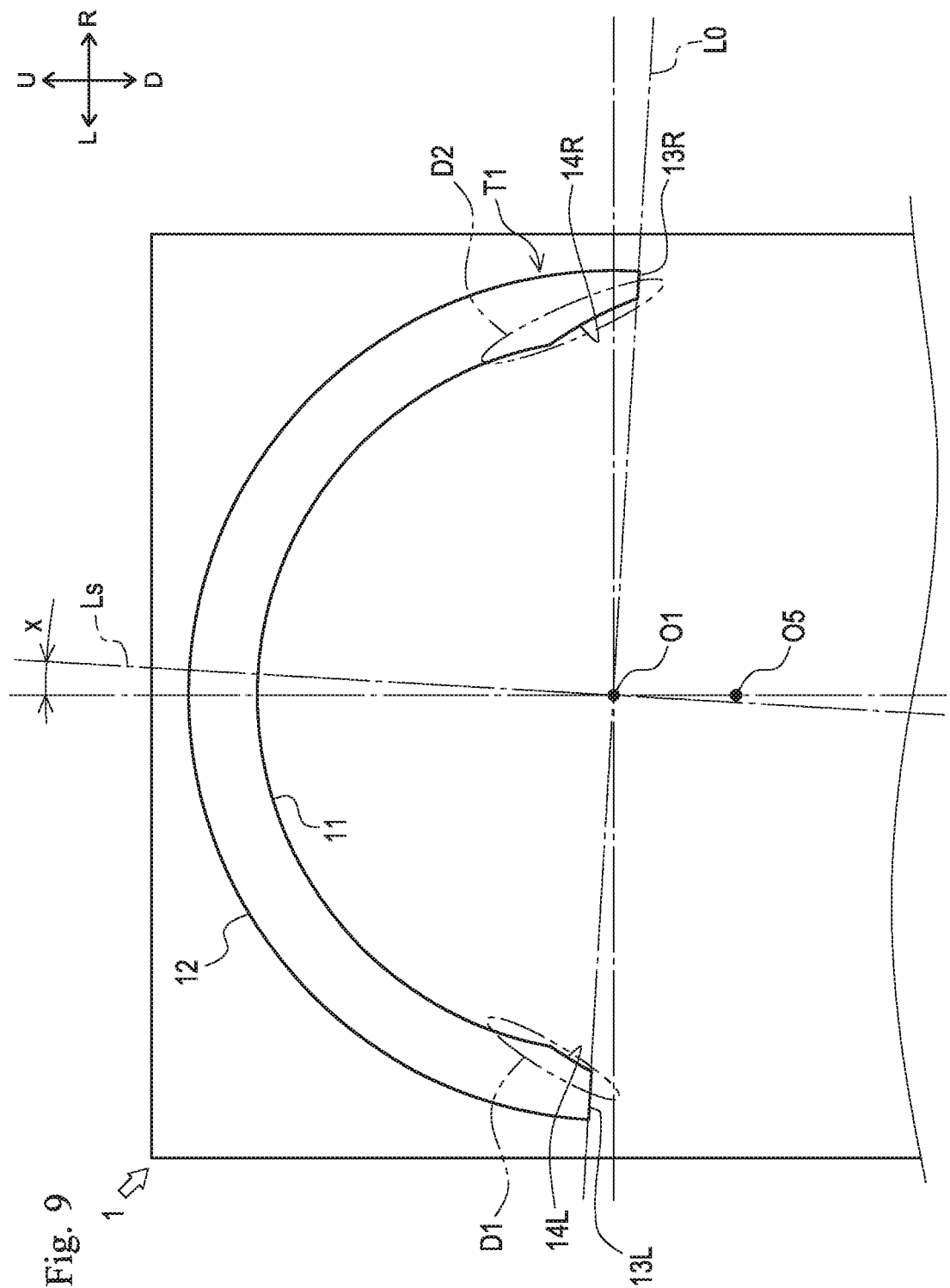
FIG. 9 is a front view showing a first area according to a fourth embodiment.

As shown in FIG. 9, the first area T1 according to the fourth embodiment does not have cut-out shapes corresponding to the left outer peripheral cut-out portion 15L and the right outer peripheral cut-out portion 15R (see FIG. 8 and the like). In other words, in the fourth embodiment, a die for punching out the thrust washer 40 does not have cut-out shapes corresponding to the left outer peripheral cut-out portion 15L and the right outer peripheral cut-out portion 15R. By using such a die, the first area T1 is punched out from the material 1 in a first punching step S2 (see FIG. 9).

Figure 10:
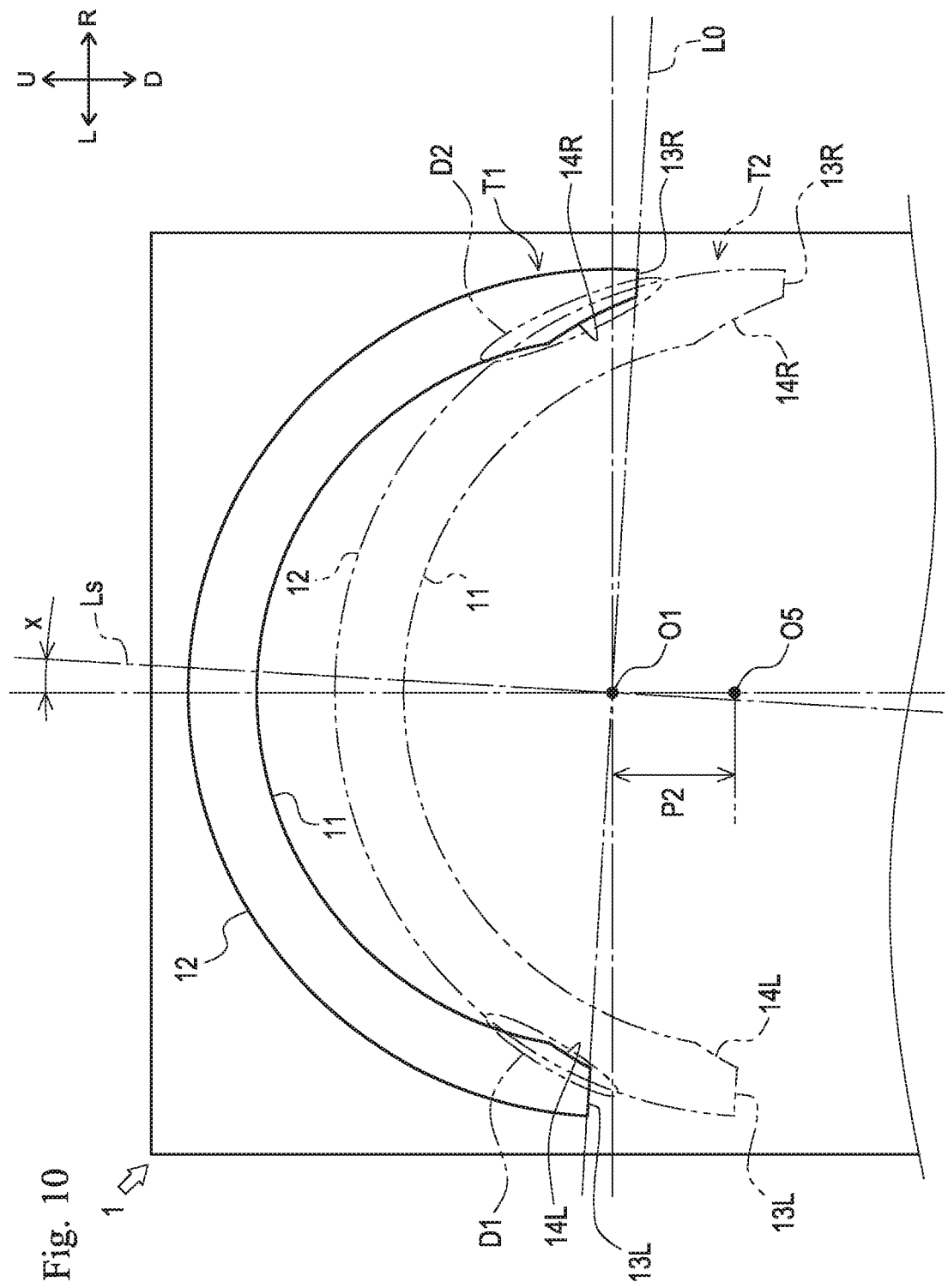
FIG. 10 is a front view showing a first area and a second area according to the fourth embodiment.
Figure 11:
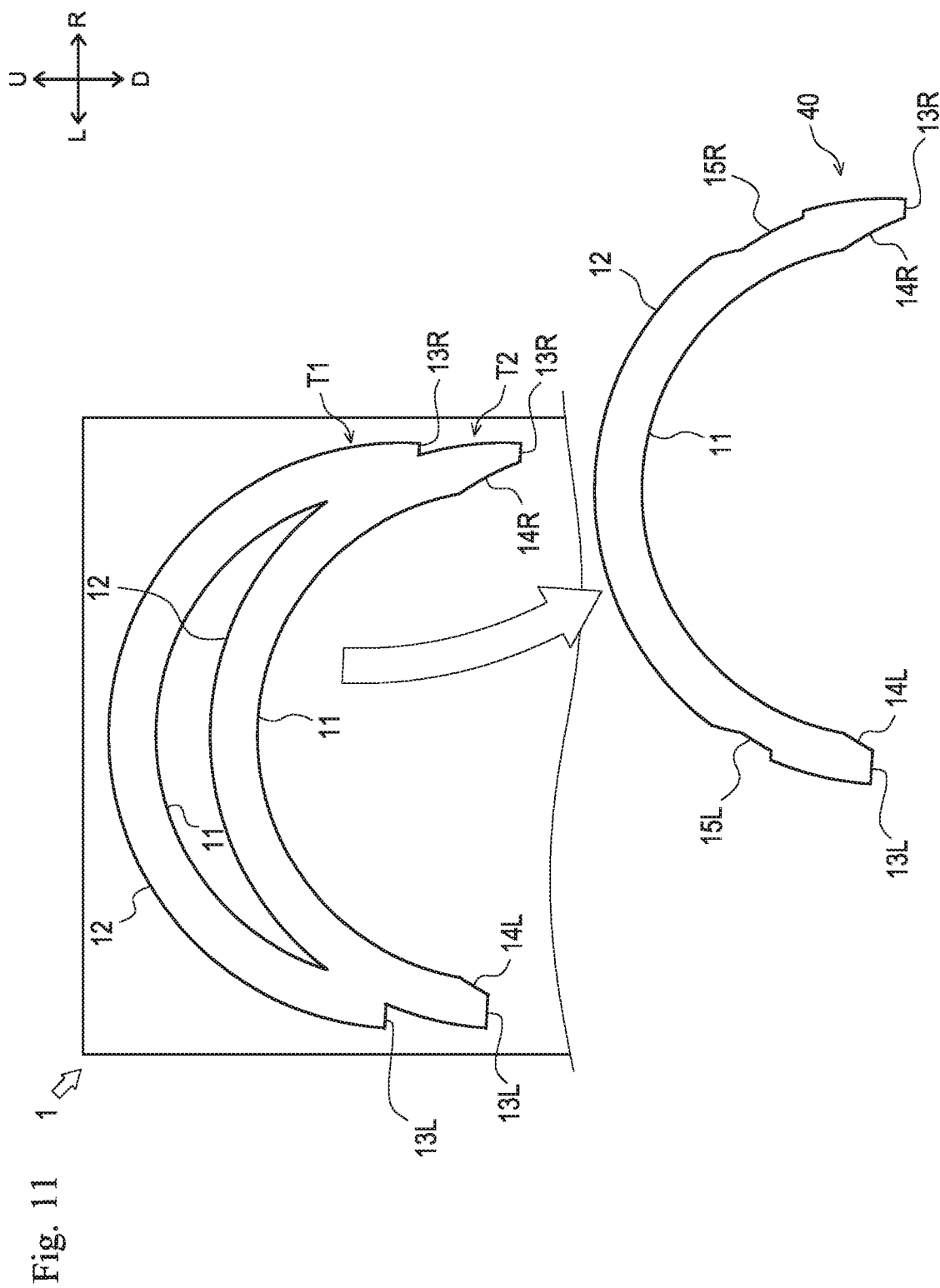
FIG. 11 is a front view showing a manner in which a thrust washer according to the fourth embodiment is punched out.
Figure 12:
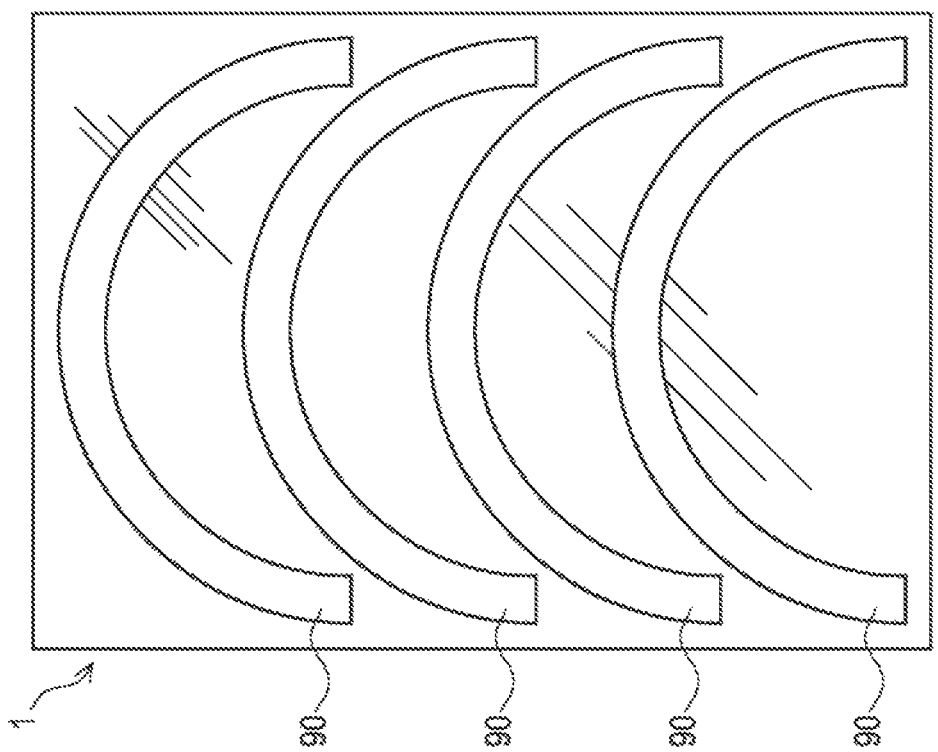
FIG. 12 is a schematic diagram showing a pitch of conventional thrust washers.

The second area T2 is set at a position displaced downward by a predetermined pitch P2 along a longitudinal direction (vertical direction) of the material 1 from the first area T1 (see FIG. 10). At this time, the second area T2 is set so as to partially overlap with the first area T1. To put it concretely, the second area T2 is set so that portions corresponding to an outer peripheral face 12 of the second area T2 overlap with a first end portion D1 and a second end portion D2 of the first area T1. By punching the second area T2, it is possible to obtain the thrust washer 40 having a left outer peripheral cut-out portion 15L and a right outer peripheral cut-out portion 15R formed on the outer peripheral face 12 (see FIG. 11).

As described above, in the method of manufacturing the thrust washers 40 according to the fourth embodiment, the second thrust washer 40 is obtained by punching the second area T2 partially overlapping with the first area T1, from which the first thrust washer 40 is punched out, in the second punching step S3.

With this configuration, it is possible to easily manufacture the thrust washer 40. In other words, the thrust washer 40 can be manufactured by using the die without the cut-out shapes corresponding to the left outer peripheral cut-out portion 15L and the right outer peripheral cut-out portion 15R and it is possible to use an existing die to manufacture the thrust washers 40. In this way, it is possible to reduce manufacturing cost.

The thrust washer 10, the thrust washer 20, the thrust washer 30, and the thrust washer 40 according to the above-described embodiments are embodiments of the washer according to the invention.

Although the embodiments of the invention have been described above, the invention is not limited to the above-described configurations and can be changed in various ways without departing from a scope of the invention described in the claims.

For example, the washer may be used not only for receiving the load in the thrust direction (as the thrust washer) but also for arbitrary purposes.

The washer may be formed not only in the semicircular shape (the arc shape having the central angle of 180°) but also in other arc shapes (e.g., an arc shape having a central angle of 90° and an arc shape having a central angle of 60°).

The shapes of the inner peripheral cut-out portions and the outer peripheral cut-out portions can be changed to any shapes such as straight shapes and arc shapes.

The inner peripheral cut-out portions do not necessarily have to be formed at the opposite end portions of the washer. In other words, a single inner peripheral cut-out portion may be formed at only one of end portions. Similarly, a single outer peripheral cut-out portion may be formed.

In punching out the second washer in the second punching step, it is possible to punch out a portion displaced in an arbitrary direction from the portion from which the first washer is punched out. For example, instead of punching out the portion displaced downward from (to a side of the end faces of) the first washer as described in each of the above-described embodiments, it is also possible to punch out a portion displaced upward from (to an opposite side from the end faces of) the first washer. If the portion displaced to the side of the end faces is punched out, the outer peripheral cut-out portions of the second washer face the end portions of the inner peripheral face of the first washer. On the other hand, if the portion displaced to the opposite side from the end faces is punched out, the end portions of the inner peripheral face of the second washer face the outer peripheral cut-out portions of the first washer.

INDUSTRIAL APPLICABILITY

The present invention is applicable to the washer formed in the arc shape.

REFERENCE SIGNS LIST

10: Thrust washer
11: Inner peripheral face
12: Outer peripheral face
13L: Left end face
13R: Right end face
14L: Left inner peripheral cut-out portion
14R: Right inner peripheral cut-out portion
15L: Left outer peripheral cut-out portion
15R: Right outer peripheral cut-out portion

The invention claimed is:

1. A washer comprising:
an inner peripheral face formed in an arc shape;
an outer peripheral face formed in an arc shape concentric with the inner peripheral face on a radially outer side of the inner peripheral face;
an outer peripheral cut-out portion having the same shape as an outside shape of a corresponding end portion of the inner peripheral face;
a first inner peripheral cut-out portion formed at one of opposite end portions of the inner peripheral face;
a second inner peripheral cut-out portion formed at the other of the opposite end portions of the inner peripheral face so that the first inner peripheral cut-out portion and the second inner peripheral cut-out portion are asymmetric in shape;
one end face connecting the first inner peripheral cut-out portion with one end of the outer peripheral face; and
an other end face connecting the second inner peripheral cut-out portion with an other end of the outer peripheral face, wherein
an arc center of a periphery along the first inner peripheral cut-out portion and the second inner peripheral cut-out portion is offset from a symmetry axis of the outer peripheral face which 1) passes through an arc center of the outer peripheral face and 2) is perpendicular to an imaginary straight line on which the one end face and the other end face are formed.

2. The washer according to claim 1, wherein the inner peripheral cut-out portions are formed in an arc shape having the same radius as a radius of the arc of the outer peripheral face.

3. A method of manufacturing washers comprising:
a preparing step of preparing a material having a panel shape;
a first punching step of punching the material to thereby obtain a first washer having a substantially arc shape; and
a second punching step of punching the material to thereby obtain a second washer having an arc-shaped inner peripheral face, an outer peripheral face formed in an arc shape concentric with the inner peripheral face on a radially outer side of the inner peripheral face, and an outer peripheral cut-out portion formed at a position of the outer peripheral face corresponding to an end portion of the inner peripheral face to have the same shape as an outside shape of the corresponding end portion of the inner peripheral face from a portion in contact with a portion from which the first washer is punched out,
wherein a first inner peripheral cut-out portion formed at one of opposite end portions of the arc-shaped inner peripheral face of the second washer and a second inner peripheral cut-out portion formed at the other of the opposite end portions of the arc-shaped inner peripheral face of the second washer are formed to be asymmetric in shape in the second punching step,
one end face connects the first inner peripheral cut-out portion with one end of the outer peripheral face, and an other end face connecting the second inner peripheral cut-out portion with an other end of the outer peripheral face, and an arc center of a periphery along the first inner peripheral cut-out portion and the second inner peripheral cut-out portion is offset from a symmetry axis of the outer peripheral face which 1) passes through an arc center of the outer peripheral face and 2) is perpendicular to an imaginary straight line on which the one end face and the other end face are formed.

4. The method of manufacturing the washers according to claim 3, wherein the second washer is punched out so that the outer peripheral cut-out portion formed on the outer peripheral face of the second washer is in contact with an end portion of an inner peripheral face of the first washer in the second punching step.

5. The method of manufacturing the washers according to claim 4, wherein the second washer is obtained by punching the second area partially overlapping with the first area in the second punching step.

6. The method of manufacturing the washers according to claim 3, wherein the second washer is obtained by punching the second area partially overlapping with the first area in the second punching step.

\* \* \* \* \*